Figure 1:
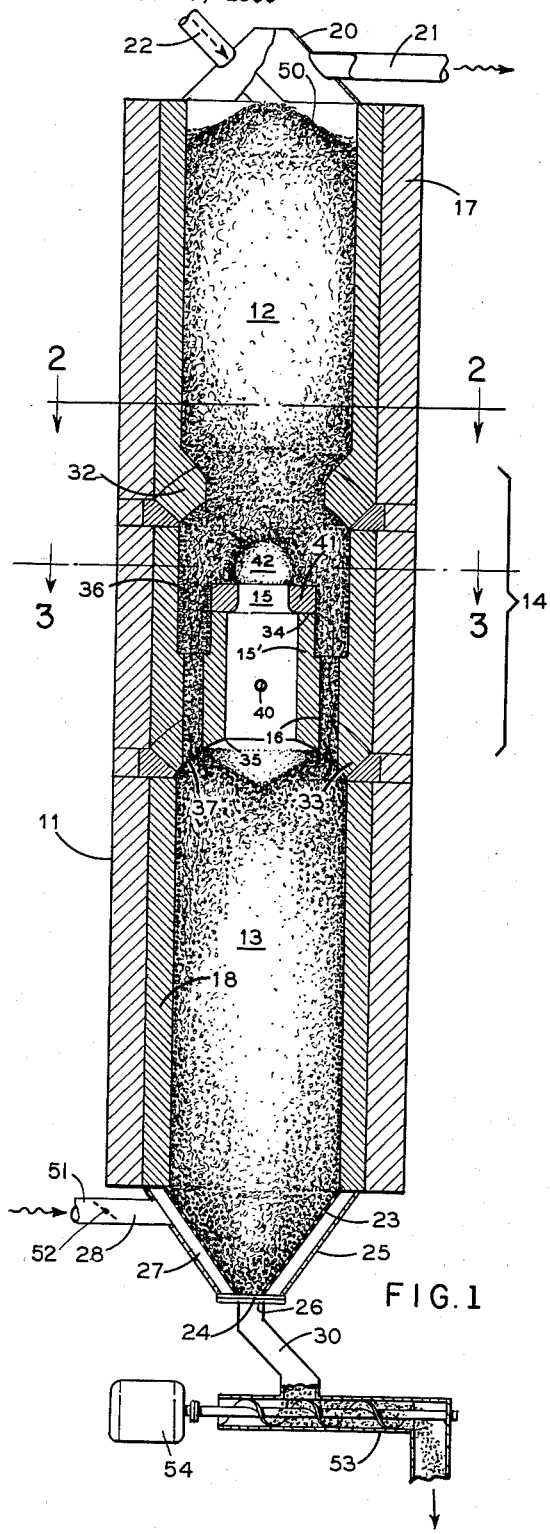

Aug. 13, 1963

C. L. NORTON, JR 3,100,633

SHAFT KILN

Filed Feb. 5, 1959

2 Sheets-Sheet 1

*INVENTOR.*
CHARLES L. NORTON, JR.
BY
*[signature]*
ATTORNEY

Aug. 13, 1963    C. L. NORTON, JR    3,100,633
SHAFT KILN
Filed Feb. 5, 1959    2 Sheets-Sheet 2

INVENTOR.
Charles L. Norton, Jr.
BY
ATTORNEY

United States Patent Office 3,100,633
Patented Aug. 13, 1963

3,100,633
SHAFT KILN
Charles L. Norton, Jr., New York, N.Y., assignor to The Babcock & Wilcox Company, New York, N.Y., a corporation of New Jersey
Filed Feb. 5, 1959, Ser. No. 791,399
13 Claims. (Cl. 263—29)

The present invention relates to the construction and operation of furnaces or kilns of the vertical shaft type for the high temperature treatment of a fluent mass or column of particulate solid material.

Industrial processes for heating solid materials to a high temperature have usually been characterized by a very low thermal efficiency except when vertical shaft kilns have been utilized. As disclosed in my Patent 2,512,442, a vertical shaft kiln is particularly effective in the heat treatment of particulate materials when high temperatures are involved. In high capacity vertical shaft kilns, the construction of the refractory portion of the kiln is sometimes difficult, particularly when high capacities are involved. It will be understood that when the burning temperature within the kiln is 3000° F. and above the strength characteristics of refractory materials is lessened and the construction and arrangement of refractory domes or arches within a kiln becomes critical.

In the present invention, an upright shaft kiln for high temperature heat treatment of a fluent or continuous mass of particulate solid materials is provided with an upwardly elongated combustion chamber positioned within an intermediate portion of the kiln. The combustion chamber is co-axial with the shaft kiln and is open at both ends so as to receive a highly heated fluent combustion constituent at its lower end while the products of high temperature combustion generated in the chamber are discharged upwardly from the upper end of the chamber. With this construction, load supporting domes of refractory material, exposed to high temperatures, are avoided. Both of the open ends of the combustion chamber are in direct communication with the mass of particulate solid material in the kiln. A plurality of upright tubular throats are circumferentially positioned around the combustion chamber for gravitational movement of the solid material mass from the upper to the lower portions of the kiln, without the particulate material passing through the combustion chamber. The lifting force of heating gas mass flow through the upper end of the combustion chamber prevents downward movement of the particulate solid therethrough, without appreciably fluidizing the mass of solids in the upper portion of the kiln. When a wall ring or baffle is spaced upwardly adjacent the open upper end of the combustion chamber, it is possible to at least partially fluidize the material being heated for advantageously reduced pressure drop of heating gas flow and an increased equalization of heating effect on the materials. While the particulate solid materials upwardly adjacent the open upper end of the combustion chamber may be in a fluidized or semifluidized state, the materials above the wall ring will remain in a particle contact or non-fluidized state for effective countercurrent and progressive heating by the heating gases. While the highly heated fluent combustion constituent, such as air, passes upwardly into the lower end of the chamber, the mass flow thereof is insufficient to fluidize the continuous particulate mass in the lower portion of the kiln or to discharge solids upwardly into the combustion chamber.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 2:
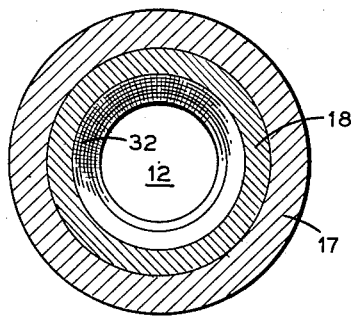
Figure 3:
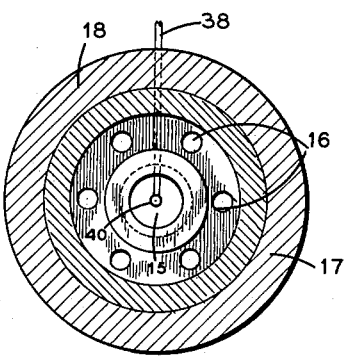

Of the drawings:
FIG. 1 is a vertical section view of a shaft kiln constructed in accordance with the present invention; and
FIGS. 2 and 3 are sections taken on the lines 2—2 and 3—3, respectively, of the kiln shown in FIG. 1.

While in its broader aspects, this invention is adapted for the continuous heating of a wide range of particulate solid materials to a wide range of final temperatures, it is particularly designed and especially useful for the heating of a continuously moving fluent mass of solid material to high temperatures, such as 3000° F. and over. Shaft kilns according to the present invention can be constructed for a wide range of capacities.

In the drawings, the invention is illustrated as embodied in a vertical shaft kiln for the burning or vitrification of ceramic refractory pebbles which may be used as an ingredient in a refractory product. Specifically, the illustrated shaft kiln may be utilized for the dead burning of magnesium oxide pebbles, for example. The pebbles under such circumstances, are formed from a magnesium oxide powder which has been pressed under high pressure to form pebbles somewhat similar in general configuration, to an almond or a peach stone. The pebbles may be of any desired configuration and in processing may be pressed in the dry condition, or may contain as much as 3 or 4% moisture when originally formed where the moisture acts as a binder.

As shown in the drawings, the kiln consists of a vertically elongated generally circular gas-tight metal casing 11 enclosing a chamber of circular cross-section. Within the casing, suitable refractories are installed to form an upper heating chamber 12 and lower cooling chamber 13 connected by an intermediate portion 14 in which a combustion chamber 15 and a plurality of throats 16 form the flow connections between the chambers 12 and 13.

In the construction of the refractory lining of the metal housing, one or more layers 17 of insulating fire brick may be positioned adjacent the inner surface of the casing 11. Inwardly of the insulating fire brick, a layer of high temperature refractory materials 18 is installed with the inner surface thereof in direct contact with the pebbles.

The upper end of the kiln is provided with a frusto-conical metallic cap 20 which is provided with an outlet pipe 21 for the discharge of heating gases and with an inlet pipe 22 for the introduction of the pebbles to be heat treated in the kiln. The lower end of the kiln is provided with an inverted frusto-conical metal screen 23 having a bottom outlet 24 and surrounded by a spaced inverted frusto-conical plate casing 25 which has a bottom discharge opening 26 spaced below the outlet 24 of the screen 23. The construction is such as to permit any solid materials passing outwardly through the screen 23 to reach the outlet 26 and to be discharged with the material leaving the lower portion of the kiln. The screen 23 and the plate 25 cooperate to define an annular fluid inlet chamber 27 therebetween to which one or more inlet pipes 28 are connected for the controlled introduction of a fluent combustion constituent under pressure. The discharge of solid material through the outlet 24 from the lower chamber 13 is controlled by a suitable discharge mechanism such as a screw conveyor or the like which is connected with the kiln by a discharge pipe 30. With the kiln filled with a fluent mass of pebbles, the rate of gravitational movement downwardly through the kiln is regulated by the rate of withdrawal from the pipe 30.

The inlet pipe 22 projecting through the cap 20 at the top of the kiln is supplied with pebbles from an external hopper (not shown) where the withdrawal of pebbles from the bottom of the shaft kiln causes a corresponding movement of untreated pebbles through the inlet pipe so that the kiln is maintained in a substantially uniformly filled condition during the operation of the unit. It is sometimes desirable to provide a fluid sealing device in the inlet pipe 22 so that the spent heating gases discharging upwardly through the unit will pass through the gas discharge pipe 21 rather than upwardly through the pebble inlet pipe.

The upper heating chamber 12 and lower cooling chamber 13 of the kiln are of substantially the same diameter throughout their extent. The intermediate portion 14 of the kiln is provided with an upper annular baffle ring 32 for a reason hereinafter described, and a lower arch 33 which provides support for the refractory materials installed in the intermediate portion of the kiln.

The elongated combustion chamber 15 is defined by a cylindrical refractory wall 15' and is positioned in coaxial relationship with the kiln, having its upper and lower ends 34 and 35, respectively, open for the passage of gases therethrough. The combustion chamber is surrounded by a circumferentially arranged series of upright tubular pebble passageways 16 which extend from an annular chamber 36 adjacent the upper end portion of the combustion chamber through the refractory material and through the arch 33. Each of the tubular passageways 16 are selected with a diameter sufficient to insure free flow of hot pebbles therethrough and sufficient to restrict the movement of hot fluids upwardly therethrough.

The annular ring 32 deflects the downwardly moving fluent mass of pebbles inwardly toward the center of the kiln and into direct, intimate contact with the ascending heating gases generated within the combustion chamber 15. After passing through the reduced cross-sectional flow area of the ring 32, the pebbles move outwardly into an annular space 36 and downwardly towards the upper end of the passageways 16. The annular space 36 surrounding the upper portion of the combustion chamber forms a soaking zone in which the pebbles are maintained substantially at their maximum temperature for a suitable time-temperature relationship for proper heat treatment of the pebbles.

In accordance with the present invention, a combustion constituent such as air is introduced through the pipe 28 into the chamber 27 at the bottom of the kiln to rise in countercurrent flow relationship with the downwardly descending pebbles for intimate heat transfer relationship therewith. The countercurrent flow of the combustion constituent through the lower chamber 13 of the kiln cools the pebbles to a convenient handling temperature for their discharge through the pipe 30, and this heat interchange preheats the combustion constituent so it leaves the upper end portion of the lower chamber at a high temperature.

With the described construction of the intermediate portion 14 of the kiln, the highly heated combustion constituent is deflected into the lower end portion of the combustion chamber 15. The deflection of the combustion constituent is accomplished by reason of the difference in the comparatively low resistance to flow through the combustion chamber 15, as compared with the high resistance to flow through the pebble filled tubular passageways 16. Within the combustion chamber, a complementary combustion constituent is introduced through the pipe 38 and the nozzle 40 igniting to combine with the preheated constituent and produce high temperature heating gases. For example, air or other oxygen containing gases may be used as the combustion constituent passed upwardly through the cooling chamber 13, while oil or natural gas or other hydrocarbon fuel may be introduced through the nozzle 40 into the combustion chamber 15 for the production of the high temperature heating gases.

As shown in FIGS. 1 and 3, the upper end portion of the combustion chamber is provided with an orifice ring 41 which has an external diameter similar to the external diameter of the combustion chamber wall while the internal diameter of the ring is less than the internal diameter of the wall 15' of the combustion chamber. With this construction, the velocity of the heating gases discharged through the orifice ring 41 from the combustion chamber will be sufficient to prevent movement of pebbles downwardly into the combustion chamber. Actually, as shown in FIG. 1, the heating gases form a bubble or free space 42 above the orifice so as to suspend the mass of pebbles immediately above the ring 41 while at the same time the velocity is insufficient to fluidize the mass of pebbles maintained in the upper heating chamber 12.

A kiln of the type described, having a nominal capacity of 50 tons per day of dead burned magnesium oxide pebbles, has an internal diameter of the upper and lower chambers of 5 feet, and an overall height of 36 feet. The internal diameter of the ring 32 is 3' 6", while the orifice 41 is 15" in diameter, with the combustion chamber 15 having a 2' diameter and a length of 4'. With the described dimensions of the combustion chamber and with six passageways 16 each having a diameter of 6¾" and 3' long, a high proportion of the combustion air preheated in passing through the lower chamber 13 will be deflected into the lower end of the chamber 15.

When burning magnesium oxide pebbles, a heating gas temperature of 3600° F. or higher may be required, and the passage of the pebbles through the lower pebble cooling chamber will preheat the air deflected into the combustion chamber to a temperature of approximately 2800° F.

In the dead burning of magnesium oxide pebbles of the type described, a fuel delivery rate of 10–12 gal. per hour of fuel oil is required, and a flow of approximately 4500 pounds of air per hour is required. Under these conditions the velocity of the preheated combustion air entering the chamber 15 will be of the order of 1960 ft. per minute, and the velocity of the heating gases leaving the orifice 41 will be of the order of 6370 ft. per minute. With pebbles of the type described, having a packed density of 125 pounds per cubic foot and a size comparable with that of a peach stone, a heating gas velocity in excess of about 9000 ft. per minute will fluidize the bed of particulate solids in the chamber 12. Fluidization of the bed above the wall baffle 32 will defeat the entire heating purposes of the kiln, since the green pebbles would be fractured. On the other hand a heating gas velocity less than about 2540 feet per minute would destroy the free space 42, since pebbles would no longer be suspended and thus would pass downwardly through the combustion chamber.

In the operation of a shaft kiln of the type and for the service described, the range of output is somewhat restricted due to the necessity for maintaining a sufficient rate of heating gas flow through the orifice 41 to maintain an air bubble 42 above the combustion chamber outlet. Moreover, the pressure drop resulting from the heating gas flow through the orifice must be low enough to avoid substantial by-passing of preheated air through the pebble passageways 16. In this connection, it will be noted that by-passing of combustion air upwardly through the passageways 16 will dilute and cool the heating gases created within the combustion chamber and thus reduce the maximum temperature attainable for heat treating the solid materials passing through the kiln.

Figure 4:
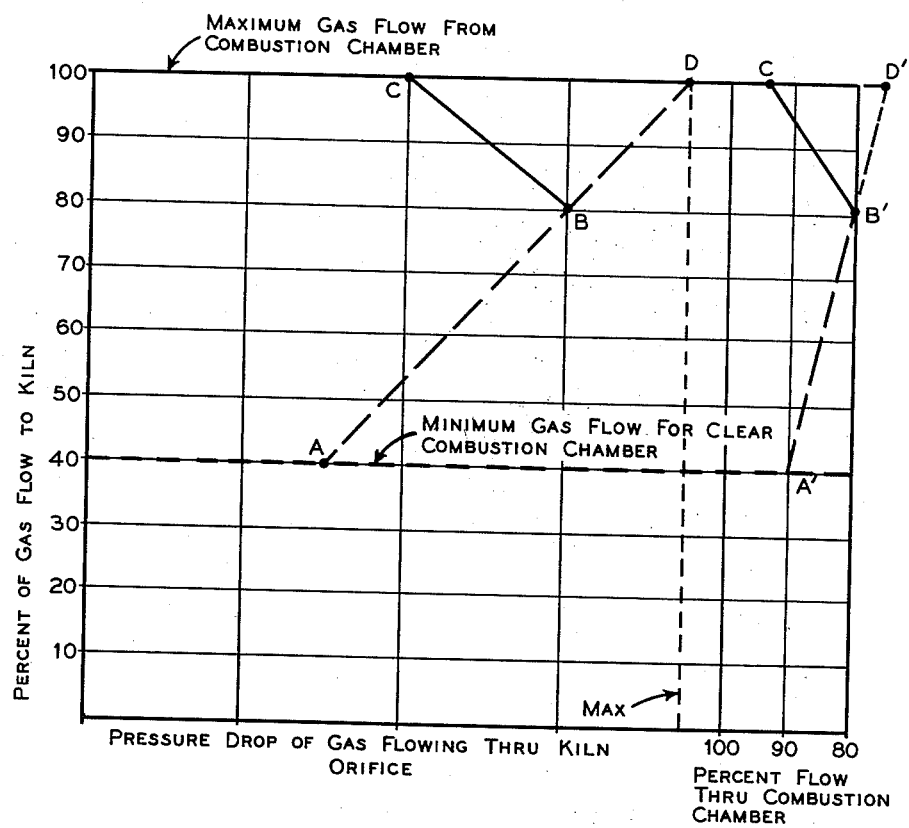

As shown in FIG. 4, the pressure drop characteristics of heating gas flowing through the shaft kiln are illustrated in terms of maximum and minimum flows necessary for successful operation of the kiln in the manner described. The curves have been drawn for a specific solid particle material having a definite size and known specific gravity, and for a specific kiln with a dimensional relationship of annular ring 32 and orifice 41 substantially as shown in FIG. 1. The characteristic shape of the curve ABC (as shown by the solid line) will be substantially as shown in FIG. 4 for a wide variety of solid particle-form materials, even though the actual flow values may differ widely.

When heating a solid particle material, such as that described, it is desirable, if not essential, to maintain a temperature gradiation between the raw material entering the kiln and the material passing through the maximum temperature heating zone, since the temperature shock of contacting the solid materials at room temperatures with gases of 3000° to 4000° F. will be extreme and the materials will shatter. Thus, it is not desirable to fluidize the mass of solids in the chamber 12. Since one of the characteristics of the fluidized bed relates to the substantial uniformity of temperatures throughout the bed, a fluidization of the materials between orifice 41 and ring 32 is desirable to attain temperature uniformity transversely of the bed in the zone of high temperatures.

As shown in FIG. 4, 100% flow represents the maximum flow of gases through the kiln without such flow causing a fluidization of pebble flow above baffle 32 in the chamber 12. Gas flow through the kiln less than 40% of the maximum flow will permit pebbles to pass downwardly through the combustion chamber 15 and thus render the unit ineffective. Thus, the maximum and minimum gas flow for operation of the kiln are represented by 100% and 40% on the curve ABC of FIG. 4. However, it will also be noted that the resistance to gas flow through the orifice continues to rise with the increase from "40% flow" to a maximum of about "80% flow," where a continued increase in flow causes the flow resistance to drop. This sudden break in the curve apparently is caused by a change in the condition or state of the mass of particles above the combustion chamber. Between 40% and 80% of flow an air bubble 42 or air arch, such as indicated in FIG. 1, is formed so that pebbles will be in suspension above the orifice 41 but will continue to flow through the passageways 16. Between 80% and 100% of flow, at least some of the pebbles above the orifice 41 and below ring 32 seem to be fluidized and thereby reduce the pressure drop of the gas flowing through the kiln orifice 41. It will be appreciated that as the pressure drop of gas flowing through the orifice 41 increases, the greater will be the percentage of the total air flowing through the kiln by-passing through the passageways 16, as shown to the right of FIG. 4.

The dotted curve ABD represents flow characteristics through the apparatus when the wall ring 32 has been removed. This curve indicates the advantage of using a wall ring 32 insofar as pressure drop through the furnace is concerned and consequently the attainment of high temperatures within the kiln. Thus, with a wall ring 32, none of the solid matter above the ring will be fluidized, and up to a maximum gas flow through the kiln, as shown in FIG. 4, solid material movement through the kiln will be maintained.

In starting up the kiln of the present invention, either green pebbles or pebbles which have previously been burned are used to fill the kiln to the level of the ring 41. Air is then introduced through the pipe 28 and the fuel through the nozzle 40 to generate heating gases. Since pebbles will accumulate in the combustion chamber 15 during the initial loading of the kiln, the flow of air through the pipe 28 is increased until the pebbles are cleared from the combustion chamber. Due to the fact that the air passing upwardly through the lower chamber 13 will not be preheated, the total weight of air so introduced will be substantially greater than the weight of air normally used during stabilized operation.

As soon as combustion conditions are established in the combustion chamber more pebbles will be introduced to fill the chamber 12 to the normal operating level indicated at 50 in FIG. 1. As heating of the pebbles is accomplished the withdrawal of pebbles through the pipe 30 is started at a slow rate, and gradually stabilized conditions are established within the kiln. As hot pebbles are passed to the lower chamber 13 and the combustion air is gradually heated to a higher temperature the rate of air flow through inlet pipe 28 is also gradually reduced.

Whenever the operation of the kiln is stopped, and flow of fuel and air is also stopped, the air arch or bubble 42 collapses with pebbles filling the combustion chamber. To restart operations it is then necessary to introduce an excess of air through the pipe 28, even though the temperature of the air entering the combustion chamber 15 may be substantially normal, so as to clear pebbles out of the combustion chamber and to re-establish the free space 42. However, this can readily be accomplished by either providing expansion space for pebbles removed from the chamber 15 in chamber 12, i.e. above level 50 or by removal of pebbles through pipe 30.

In controlling the operations of the kiln of the present invention, it is desirable to measure the rate of air flow through the pipe 28. This may be accomplished by differential pressures measured by flow through an orifice 51 in pipe 28, with flow rate controlled by valve 52. The rate of pebble flow through pipe 30 is controlled by a screw feeder 53 which is operated at a controlled speed by a variable speed motor 54. Alternately, the feeder may be of the rotating table type disclosed in U.S. Patent 2,468,712, of a belt or apron type, or it may be of the weighing type, if desired. Under stabilized operating conditions, i.e. substantially uniform fuel and flow to the unit, and a substantially uniform rate of pebble withdrawal, the temperature of the spent heating gases leaving the pipe 21 will also be substantially uniform. The latter temperature may be of the order of 200° F., and any variation therefrom would indicate the need for increasing or decreasing fuel and air flow to the unit.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for the heat treatment of a fluent mass of solid material comprising walls defining an elongated shaft kiln having an upper heating chamber and a lower cooling chamber with a cross-sectional flow area at least equal to the upper chamber, said shaft kiln having an upper inlet and a lower outlet for said fluent solid material and having a spent heating gas outlet in the upper portion thereof, means for causing a substantially continuous movement of said material through said kiln, walls defining a combustion chamber positioned within said kiln and between said heating and cooling chambers, said combustion chamber walls forming a tube open at the top and bottom and having a cross-sectional area less than the adjacent portion of said shaft kiln, means for passing said solid material downwardly through restricted flow paths between said kiln walls and the walls of said combustion chamber into said cooling chamber, and means for introducing combustion constituents into said combustion chamber to produce high temperature heating gases for passage upwardly from said combustion chamber and through said heating chamber to heat treat the solid materials therein including means for introducing a fluid combustion constituent into the lower part of said cooling chamber.

2. Apparatus for the heat treatment of a fluent mass of solid material comprising walls defining an elongated shaft kiln having an upper heating chamber and a lower cooling chamber with a cross-sectional flow area at least equal to the upper chamber, said shaft kiln having an upper inlet and a lower outlet for said fluent solid material and having a spent heating gas outlet in the upper portion thereof, means for causing a substantially continuous movement of said material through said kiln, walls defining a combustion chamber positioned within said kiln between said heating and cooling chambers, said combustion chamber walls forming a tube open at the top and bottom and having a cross-sectional area less than the adjacent portions of said shaft kiln, means for passing said solid material downwardly through restricted flow paths between said kiln walls and the walls of said combustion chamber into said cooling chamber, an annular ring horizontally disposed in the upper portion of said kiln upwardly adjacent the top of said combustion chamber, and means for introducing combustion constituents into said combustion chamber to produce high temperature heating gases for passage upwardly from said combustion chamber and through said heating chamber to heat treat the solid materials therein including means for introducing a fluid combustion constituent into the lower part of said cooling chamber.

3. Apparatus for the heat treatment of a fluent mass of solid material comprising walls defining an elongated shaft kiln having an upper heating chamber and a lower cooling chamber with a cross-sectional flow area at least equal to the upper chamber, said shaft kiln having an upper inlet and a lower outlet for said fluent solid material and having a spent heating gas outlet in the upper portion thereof, means for causing a substantially continuous movement of said material through said kiln, walls defining a combustion chamber positioned within said kiln and between said heating and cooling chambers, said combustion chamber walls forming a tube open at the top and bottom and having a cross-sectional area less than the adjacent portions of said shaft kiln, means for passing said solid material downwardly through restricted flow paths between said kiln walls and the walls of said combustion chamber and into the cooling chamber, means for introducing a combustion constituent into the lower portion of said kiln to cool the solid materials in said lower chamber during upward movement therethrough and into the open bottom of the combustion chamber, and means for introducing a combustion constituent into said combustion chamber, said fuel constituents combining with said combination chamber to produce high temperature heating gases for passage upwardly from said combustion chamber and through the upper heating chamber toward said spent heating gas outlet to heat treat the solid materials therein.

4. Apparatus for the heat treatment of a fluent mass of solid material comprising walls defining an elongated shaft kiln having an upper heating chamber and a lower cooling chamber with a cross-sectional flow area at least equal to the upper chamber, said shaft kiln having an upper inlet and a lower outlet for said fluent solid material and having a spent heating gas outlet in the upper portion thereof, means for causing a substantially continuous movement of said material through said kiln, walls defining a combustion chamber positioned within said kiln between said heating and cooling chambers, said combustion chamber walls forming a tube open at the top and bottom and having a cross-sectional area less than the adjacent portions of said shaft kiln, means forming a gas flow restriction in the open top of said combustion chamber, means for passing said solid material downwardly through restricted flow paths between said kiln walls and the walls of said combustion chamber and into the lower cooling chamber, an annular ring horizontally disposed in the upper portion of said kiln upwardly adjacent the top of said combustion chamber, means for introducing a combustion constituent into the lower portion of said kiln to cool the solid material in said lower chamber during upward movement therethrough and into the open bottom of the combustion chamber, and means for introducing a combustion constituent into said combustion chamber, said fuel constituents combining within said combustion chamber to produce high temperature heating gases for passage upwardly from said combustion chamber and through the upper heating chamber toward said spent heating gas outlet to heat treat the solid materials therein.

5. Apparatus for the heat treatment of a fluent mass of solid material comprising walls defining an elongated shaft kiln having an upper heating chamber and a lower cooling chamber with a cross-sectional flow area at least equal to the upper chamber, said shaft kiln having an upper inlet and a lower outlet for said fluent solid material and a spent heating gas outlet in the upper portion thereof, means for causing a substantially continuous movement of said material through said kiln, walls defining a combustion chamber positioned within and coaxial with said kiln between said heating and cooling chambers, said combustion chamber walls forming a tube open at the top and bottom and having a cross-sectional area less than the adjacent portions of said shaft kiln, means for passing said solid material downwardly through restricted flow paths between said kiln walls and the walls of said combustion chamber and into said cooling chamber, means for introducing a combustion constituent into the lower portion of said combustion chamber, means for passing a separate gaseous combustion constituent upwardly through the lower part of said cooling chamber to cool the solid materials passing downwardly therethrough and to preheat the gaseous constituent, means for burning said fuel constituents within said combustion chamber to produce high temperature heating gases for passage upwardly from said combustion chamber and through the upper chamber to heat treat the solid materials therein.

6. Apparatus for the heat treatment of a fluent mass of solid material comprising walls defining an elongated shaft kiln having an upper heating chamber and a lower cooling chamber with a cross-sectional flow area at least equal to the upper chamber, said shaft kiln having an upper inlet and a lower outlet for said fluent solid material, means for causing a substantially continuous movement of said material through said kiln, walls defining a combustion chamber positioned within said kiln and between said heating and cooling chambers, said combustion chamber walls forming a tube open at top and bottom and having its exterior walls spaced from the inner surface of the walls defining said shaft kiln, the open top and bottom of said tube being coaxial with said combustion chamber walls, means forming a plurality of tubular passageways circumferentially spaced about said combustion chamber walls and spaced between the walls of said shaft kiln and said combustion chamber for movement of said fluent mass of solid material therethrough, means for introducing fuel into the lower portion of said combustion chamber, means for passing air upwardly through the lower chamber to cool the solid materials passing downwardly therethrough and to preheat said air, said tubular passageways having a greater resistance to air flow therethrough than said combustion chamber to direct substantially all of said air into said combustion chamber to combine with said fuel in forming high temperature heating gases for passage upwardly from said combustion chamber and through the upper chamber to heat treat the solid materials therein, the lifting velocity of the heating gases leaving the open end of said combustion chamber being sufficient to maintain the upper end thereof free of said solid materials.

7. Apparatus for the heat treatment of a fluent mass of solid material comprising walls defining an elongated shaft kiln having an upper heating chamber and a lower cooling chamber with a cross-sectional flow area at least equal to the upper chamber, said shaft kiln having an upper inlet and a lower outlet for said fluent solid material, means for causing a substantially continuous movement of said material through said kiln, walls defining a combustion chamber positioned within said kiln and between said heating and cooling chambers, said combustion chamber walls forming a tube open at top and bottom and having its exterior walls spaced from the inner surface of the walls defining said shaft kiln, means forming a gas flow restriction at the open top of said combustion chamber, the open top and bottom of said tube being coaxial with said combustion chamber walls, an annular ring horizontally disposed in the upper portion of said kiln upwardly adjacent the top of said combustion chamber, means forming a plurality of tubular passageways circumferentially spaced about said combustion chamber walls and spaced between the walls of said shaft kiln and said combustion chamber for movement of said fluent mass of solid material therethrough, means for introducing fuel into the lower portion of said combustion chamber, means for passing air upwardly through said lower chamber to cool the solid materials passing downwardly therethrough and to preheat said air, said tubular passageways having a greater resistance to air flow therethrough than said combustion chamber to direct substantially all of said air into said combustion chamber to combine with said fuel in forming high temperature heating gases for passage upwardly from said combustion chamber and through the upper chamber to heat treat the solid materials therein, the lifting velocity of the heating gases leaving the open end of said combustion chamber being sufficient to maintain the upper end thereof free of said solid materials.

8. Apparatus for the heat treatment of a fluent mass of solid materials comprising walls defining an elongated chamber having an upper inlet and a lower outlet for said fluent solid material and having a spent heating gas outlet in the upper portion thereof, means for maintaining a substantially continuous column of said material moving through said chamber, walls defining a combustion chamber positioned within said elongated chamber, said combustion chamber walls forming a tube open at its upper end into and having a cross-sectional flow area less than that of said elongated chamber, an annular ring horizontally disposed in said elongated chamber upwardly adjacent the top of said combustion chamber, and means for combining fuel constituents within said combustion chamber to produce high temperature heating gases for passage upwardly from said combustion chamber and through said elongated chamber to heat the solid materials therein, the lifting velocity of the heating gases leaving the open end of said combustion chamber being sufficient to maintain the upper end thereof free of said solid materials.

9. Apparatus for the heat treatment of a fluent mass of solid material comprising walls defining an upwardly elongated chamber having an upper inlet and a lower outlet for said fluent solid material and having a spent heating gas outlet in the upper portion thereof, means for maintaining a substantially continuous column of said material moving downwardly through said elongated chamber, walls defining a combustion chamber positioned within the lower portion of said elongated chamber, said combustion chamber walls forming a tube opening into said elongated chamber at its upper end and having a cross-sectional flow area less than that of said elongated chamber, means forming a gas flow restriction at the upper end of said combustion chamber, means for passing said fluent solid material downwardly between said elongated chamber walls and the walls of said combustion chamber, and means for combining fuel constituents within said combustion chamber to produce high temperature heating gases for passage upwardly from said combustion chamber and through said heating chamber toward said spent elongated gas outlet to heat the solid material therein.

10. Apparatus for the heat treatment of a fluent mass of solid material comprising walls defining an elongated chamber having an upper inlet and a lower outlet for said fluent solid material and having a spent heating gas outlet in the upper portion thereof, means for maintaining a substantially continuous column of said material moving downwardly through said elongated chamber, walls defining a combustion chamber positioned within said elongated chamber, said combustion chamber walls forming a tube opening into said elongated chamber at its upper end and having a cross-sectional flow area less than that of said elongated chamber, means forming a gas flow restriction at the upper end of said combustion chamber, an annular ring horizontally disposed in and reducing the cross-section of said elongated chamber upwardly adjacent the top of said combustion chamber, means for passing said fluent solid material downwardly between said elongated chamber walls and the walls of said combustion chamber, and means for combining fuel constituents within said combustion chamber to produce high temperature heating gases for passage upwardly from said combustion chamber and through said elongated chamber toward said spent heating gas outlet to heat the solid material therein.

11. The method of heating particle-form solid materials which comprises the steps of passing a stream of heating gases through a body of said particle-form solid materials to fluidize said body for substantially uniform temperatures in said body, passing substantially all the heating gases from said fluidized body through a continuous particle contacting mass of said particle-form materials for progressive heating of said materials, passing said particle-form solid materials at a substantially continuous rate successively and without interruption through said continuous mass and said fluidized body in countercurrent flow relationship with said heating gas, and thereafter passing said particle-form solid materials from said fluidized body through a cooling zone wherein said solid materials are cooled in preheating a combustion constituent.

12. The method of heating particle-form solid materials which comprises the steps of passing a stream of heating gases through a downwardly moving continuous mass of said particle-form materials for progressive heating of said materials, controlling the flow of velocity of said heating gases upwardly into said moving mass to form an air arch to prevent downward movement of said solid materials through said air arch, and passing said particle-form solid materials at a substantially continuous rate successively through said continuous mass in countercurrent flow reationship with said heating gases and downwardly around said air arch.

13. The method of heating particle-form solid materials which comprises the steps of gravitationally passing a continuous column of particle-form solid material through a heating zone, passing a stream of heating gases upwardly through said heating zone, and regulating the velocity of said heating gas stream passing through said column of particle-form solid materials to fluidize the particle-form materials in the lower portion of said column while maintaining the upwardly adjacent particle-form materials of said column in a non-fluidized particle contacting form.

References Cited in the file of this patent

UNITED STATES PATENTS

| | | |
|---|---|---|
| 1,158,372 | Carnie | Oct. 26, 1915 |
| 2,345,067 | Osann | Mar. 28, 1944 |
| 2,529,366 | Bauer | Nov. 7, 1950 |
| 2,585,984 | Alexander et al. | Feb. 19, 1952 |
| 2,607,666 | Martin | Aug. 19, 1952 |
| 2,668,041 | Knibbs | Feb. 2, 1954 |
| 2,788,961 | Pooley et al. | Apr. 16, 1957 |
| 2,932,498 | Metcalfe et al. | Apr. 12, 1960 |

FOREIGN PATENTS

| | | |
|---|---|---|
| 465,302 | France | Apr. 14, 1914 |